Aug. 29, 1939.   R. PLASTINO   2,171,293

RADIO NAVIGATIONAL GUIDE SYSTEM

Original Filed April 27, 1935   3 Sheets—Sheet 1

INVENTOR
Rubino Plastino,
BY
Fraser, Myers & Manley
ATTORNEYS.

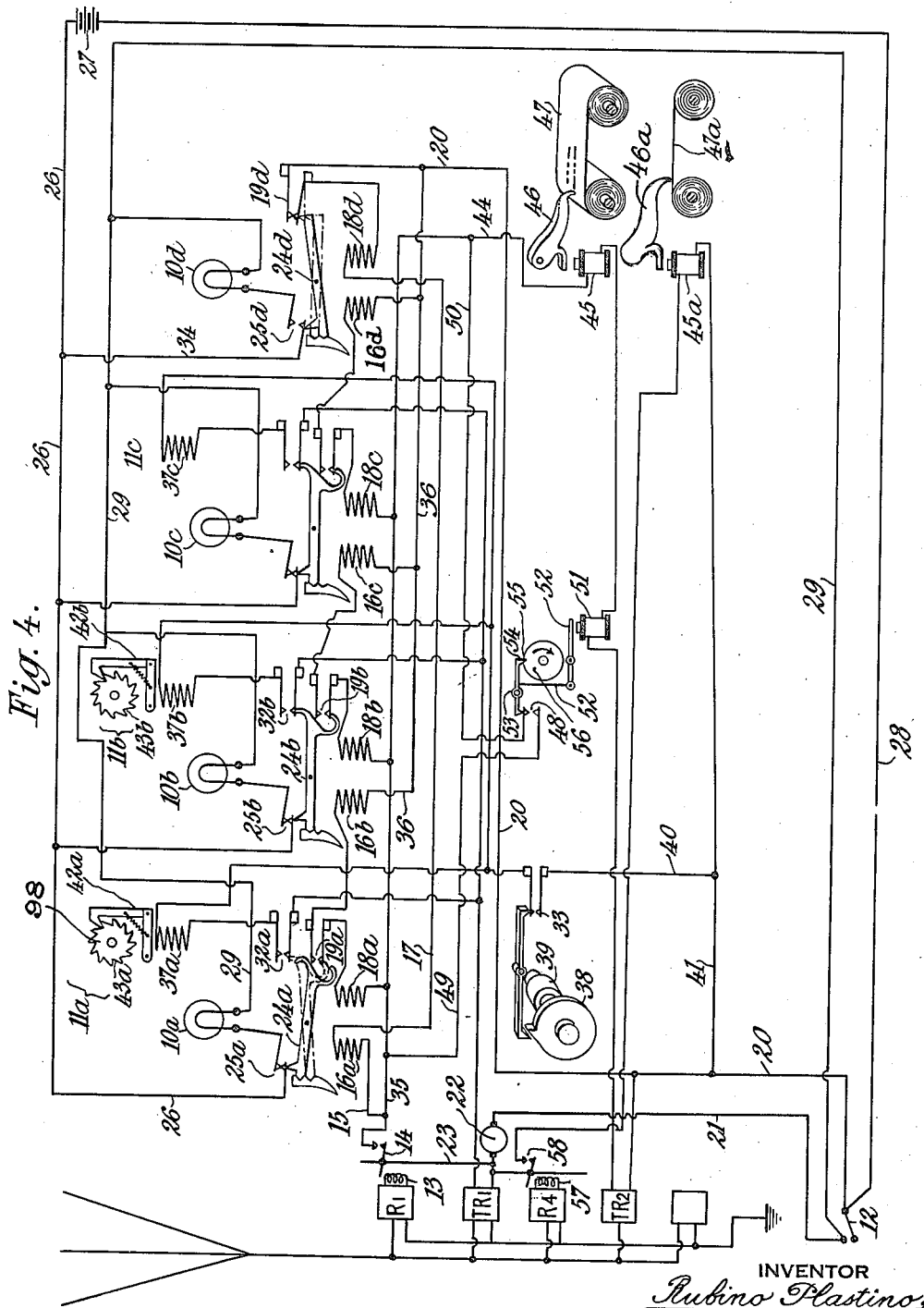

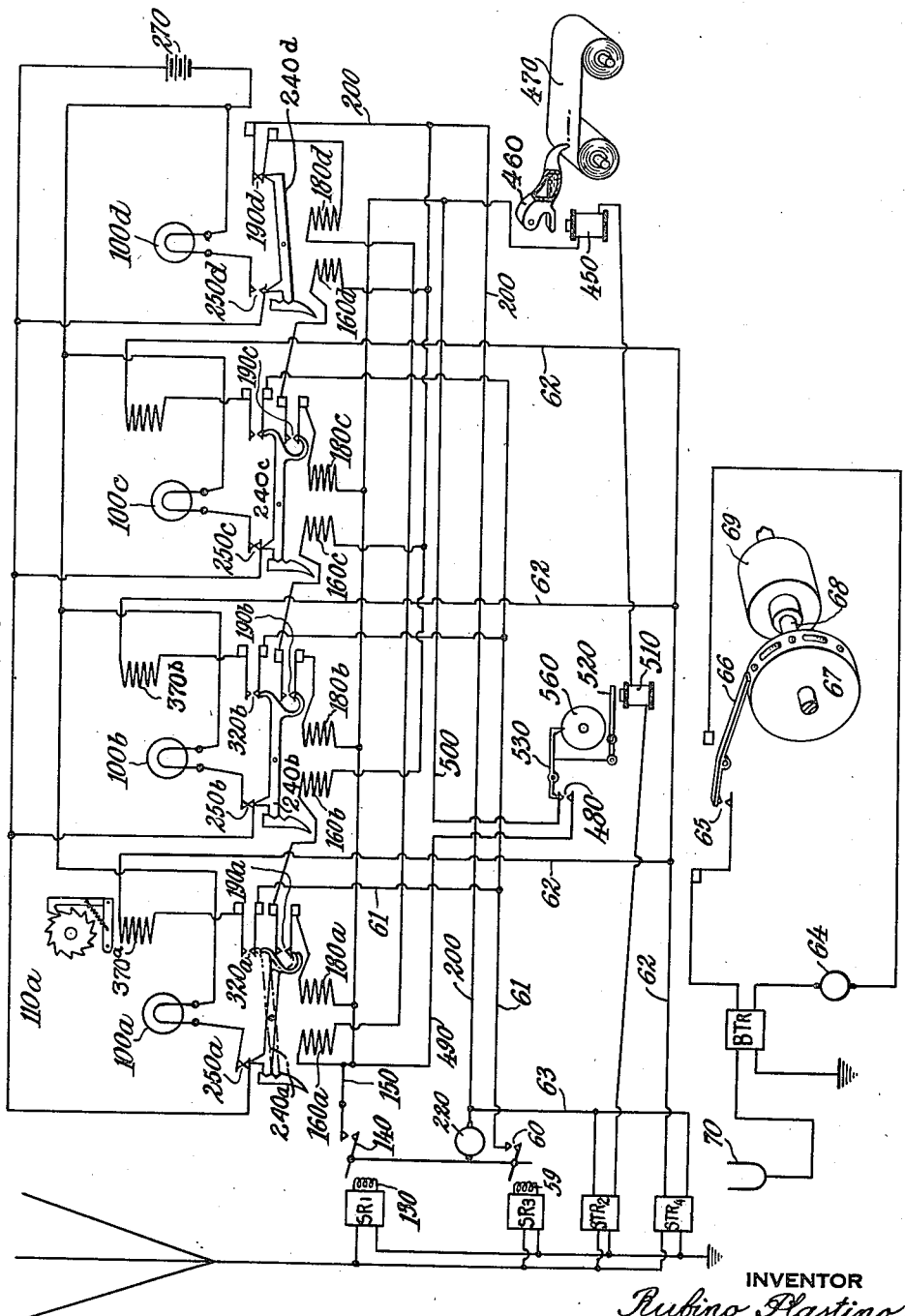

Patented Aug. 29, 1939

2,171,293

UNITED STATES PATENT OFFICE 2,171,293

RADIO NAVIGATIONAL GUIDE SYSTEM

Rubino Plastino, New York, N. Y., assignor to Transoceanic Aerial Control System, Inc., Wilmington, Del., a corporation of Delaware Original application April 27, 1935, Serial No. 18,581. Divided and this application March 19, 1937, Serial No. 131,809

13 Claims. (Cl. 250—2)

This application is a division of my copending application Serial No. 18,581, filed April 27, 1935, and the invention described herein relates generally to aerial transportation systems. In its more particular aspects it contemplates the provision of a system for maintaining communication between a plurality of ground stations located at spaced points along a proposed course of flight, and an aircraft guided along that course by horizontal radio beams propagated from the stations.

The principal object of the present invention is to provide at each of a plurality of ground stations each having directional radio transmitting apparatus which defines a course of flight, means for creating a vertical radio beam which, in combination with apparatus carried on a plane flying along the course and at each such station, will indicate the passage of the plane successively through the various vertical beams whereby the progress of the plane along its designated route may be tracked and constantly checked.

It is another object of the invention to provide means for automatically transmitting radio signals from the plane at regularly timed intervals while it is in flight, and means both on the plane and at each of the ground stations for registering these regularly timed signals so that their total number, at any time, indicates the elapsed time of flight of the plane.

The full nature of my invention, and other objects and various advantages thereof will be more apparent from the following description when read in the light of the accompanying drawings, in which—

Fig. 4 is a diagrammatic representation of a panel board such as is shown in Fig. 3, particularly illustrating the electrical interconnection of the various indicating and recording instruments mounted thereon with various radio receivers and transmitters carried on a plane, all to effectuate the principles of the present invention;

Fig. 5 is another diagrammatic view, similar in character to Fig. 4, of an instrument panel board, and of various radio receivers and transmitters, adapted to be installed at a ground station in accordance with the principles of the present invention.

Figure 1:
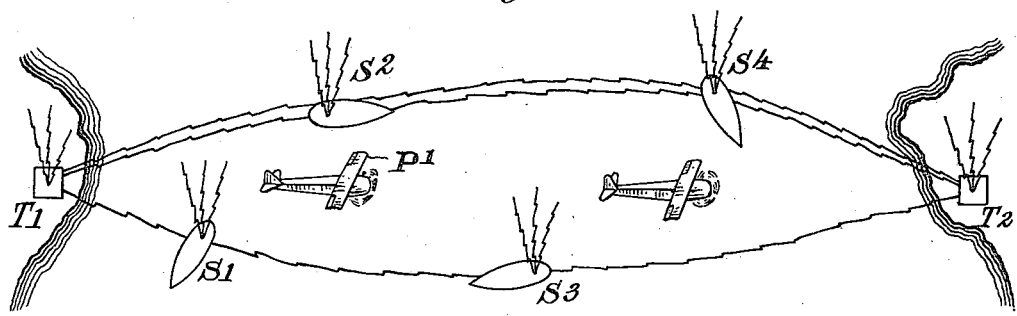
Figure 1 illustrates diagrammatically an arrangement of ships, platforms or other relatively stationary stations along a proposed course of flight in accordance with the present invention.
Figure 2:
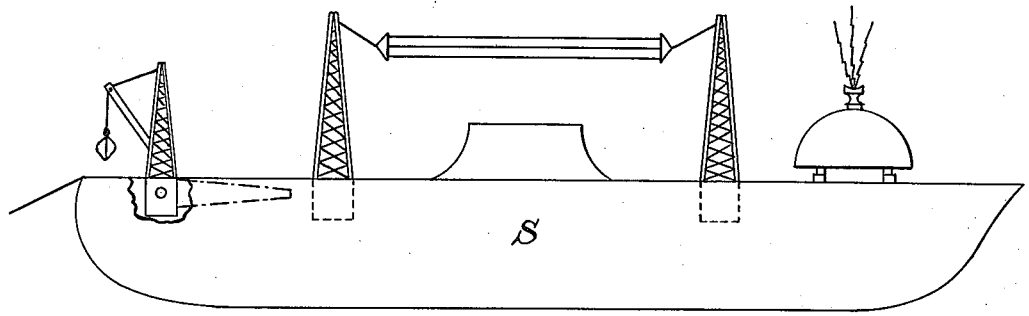
Fig. 2 is an elevational view of one of the ships of Fig. 1.

The proposed course of flight as illustrated in Fig. 1 lies between terminals $T_1$ and $T_2$ over an open water course such as an ocean, and at spaced points between these terminals there are anchored a plurality of ships $S_1$, $S_2$, $S_3$ and $S_4$, one of which is illustrated very generally in Fig. 2. The ocean route is chosen for illustrative purposes only, and since the features of the invention, as will later be apparent, are readily applicable to an overland route, each of these ships will hereinafter be referred to under the broad term of "ground stations".

Each such ground station is provided with radio transmitting means and directional antenna such as to create a horizontal directional beam between the stations for the purpose of guiding a plane therealong, all in a well known manner. Further, each of the stations has other radio transmitting apparatus BTR and other directional antenna for creating a vertical beam through which the plane, if flying along the proposed route, must pass. The radio frequency energy output of each transmitter BTR is modulated by an automatically operated key provided for that purpose, as will later be considered; and a different Continental, Morse or other code character is assigned to each station for identification purposes. Consequently the pilot of a plane passing through the vertical beam from $S_1$ for example, may be apprised not only of the fact that he is passing through a beam but that it is the beam from $S_1$. Similarly, with regard to the other stations.

For the purpose of indicating the progress of the plane, I preferably provide a panel board 25 having a series of lights thereon, each representing one of the ground stations, including the terminals, along the proposed route, and means whereby all of these lights will successively go off and come on to indicate the passage of the plane over such stations. Specifically, the arrangement is such that when a plane, $P_1$ for example, leaves terminal station $T_1$, light 10a will immediately go off and the other lights, 10b, c, d, e and f, will all come on. Thereafter, as the plane passes $S_1$, light 10b, representing this latter station, will be darkened, and light 10a, representing $T_1$, will again be lit. The rest of the lights, 10c, d, e and f, etc., will remain on. Similarly, as the plane passes $S_2$, light 10c will go off, light 10b come on, etc., so that the light which is dark represents the ground station last passed by the plane. In this manner, by a mere glance at the board, the pilot can always tell his approximate position, that is, he can tell which ground station was last passed.

Figure 3:
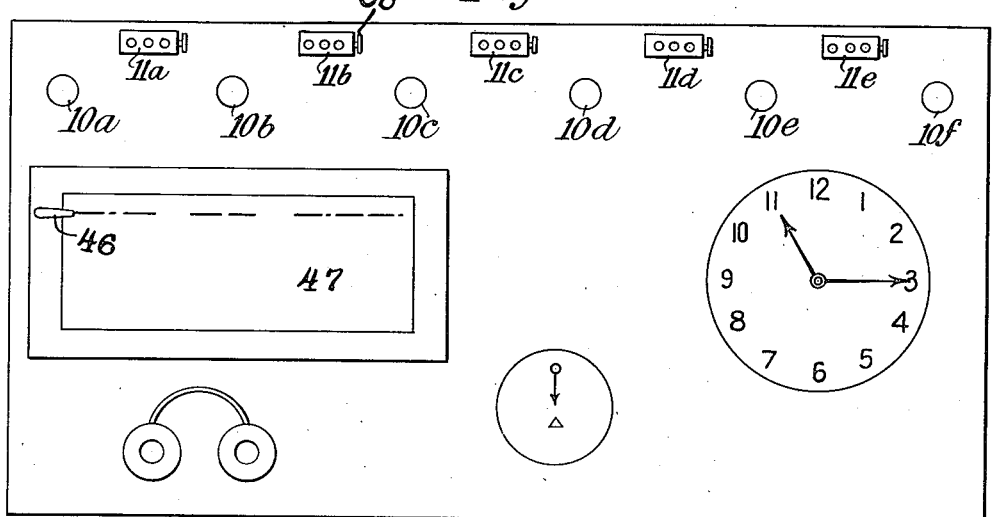
Fig. 3 is an elevational view of a panel board showing the various instruments used in tracking the progress of a plane along the route of Fig. 1.

It is equally important that the ground stations along the route shall be apprised at all times of the position of the plane, and for this purpose the invention provides a panel board similar in outward appearance to that shown in Fig. 3, and radio transmitting means on the plane, responsive to the receipt of radiant energy from the vertical radio beams, for affecting radio receiving means on the ground station so as to operate the lights exactly in the manner set forth in connection with the panel board on the plane.

Further, each panel board, both on the plane and on the various ground stations, is provided with a plurality of meters 11a, b, c, d and e, each operatively associated with one adjacent pair of indicating lights, and solenoid means, Figs. 4 and 5, for operating said meters so as to record the time of flight of the plane between the various ground stations. The construction of the meters per se forms no part of the present invention. Any one of a number of old and well known arrangements may be used. For present purposes suffice it to say that each meter consists of a plurality of counter discs having the numerals 0–9 thereon, arranged to be driven from a common shaft indicated at 98 in such manner that each part movement of the shaft causes a successive number to appear upon the counter discs. Examples of counters of this general class which are adaptable to the present purpose will be found in United States Patents Nos. 950,601; 1,044,710; and 1,261,449.

As will later be apparent, if the plane were to reverse itself, and pass successively back and forth over any one of the ground stations, each of the lights would come on and go off, and each of the meters become operative and inoperative, so that, to the pilot, it would appear that he had progressed over the entire course, whereas in fact he would have made no progress whatsoever. In order to prevent any such possibility as this, the invention provides a chart 47, and means for recording on such chart the identifying signal of the vertical radio beam through which the plane is then passing. Hence, if, as above suggested, the plane did become lost and fly back and forth over one particular station, while the lights would operate seriatim, the chart would show a code identification of only one ship. Consequently, the pilot would immediately be apprised of what was happening and would take the necessary steps to get back on his course.

The construction and operation of the panel board for the plane is illustrated diagrammatically in Fig. 4. For the sake of simplicity only four lights, 10a, b, c and d, are illustrated, but it is to be understood that additional lights representing other stations may be incorporated.

Considering the operation of this board, and assuming that the pilot is just preparing to take off from terminal T1, his first act will be to close hand switch 12, thereby placing the board in operation. Consequently, lights 10a, b and c will come on, whereas 10d will be dark. As the plane passes over the boundaries of the field at T1, radio receiver R1 will pick up the vertical beam transmitted from T1, and the energy output of this receiver will energize relay 13 to close the associated key 14 and complete an electrical circuit including line 15, turn-off relay 16a (associated with light 10a), line 17, turn-on relay 18d (associated with light 10d) contacts 19d, line 20, switch 12, line 21, generator 22, and line 23, back to the key 14. The resulting energization of relay 16a will pull down the left-hand end of teeter bar 24a to the position shown in dotted lines, thus opening the contacts 25a to break the electrical circuit including light 10a, through line 26, battery 27, line 28, switch 12 and line 29. The movement of teeter bar 24a to the position shown in dotted lines in Fig. 3 as the result of the energization of relay 16a also operates to close contacts 19a so as to place turn-on relay 18a (associated with light 10a) in series with turn-off relay 16b of light 10b, as will later be apparent; and to close contacts 32a for the purpose of placing a solenoid 37a operatively associated with time-recording meter 11a in circuit with the automatically operated key 33 and radio transmitter TR1 (sending out signals at regularly spaced intervals to indicate the time of flight), as will later be made evident.

The simultaneous energization of relay 18d draws the right-hand end of teeter bar 24d downwardly to open contacts 19d, thereby breaking the series circuit between turn-off relay 16a of light 10a and turn-on relay 18d of light 10d; and to close contacts 25d and the electrical circuit including line 34, line 26, battery 27 and switch 12 so as to turn on light 10d.

When the plane, guided by the horizontal radio beam, has progressed along its course sufficiently to come under the influence of the vertical radio beam from ground station S1, then R1 will pick up this vertical beam and again energize relay 13 to close contacts 14, thereby completing an electrical circuit including line 35, turn-on relay 18a (associated with light 10a), contacts 19a, turn-off relay 16b (associated with light 10b), line 36, line 20, key 12, line 21, generator 22, and back to key 14. The resulting energization of turn-on relay 18a will pull the right hand end of teeter bar 24a downwardly to close contacts 25a, thus closing the electrical circuit including light 10a which thereupon comes on, and opening contacts 19a so as to break the circuit including relays 18a and 16b; and opening contacts 32a so as to remove the time meter 11a from circuit with the automatic transmitter TR1.

The simultaneous energization of turn-off relay 16b draws the left-hand end of teeter bar 24b downwardly to break contacts 25b, and open the electric circuit including the light 10b, which thereupon is darkened; and to make contact at 19b so as to place turn-on relay 18b (associated with light 10b) in series with turn-off relay 16c (associated with light 10c) so that these two relays will be energized upon the closing of key 14 in response to passage of the plane through the vertical beams emanating from the next succeeding ground station; and closing contacts 32b so as to place meter 11b in electrical circuit with the automatic key 33 and transmitter TR1.

Subsequent energization of relay 13, when the plane passes through the vertical radio beam emitted from ship S2 to close contacts 14, will operate relay 18b to turn light 10b back on, and to operate relay 16c to turn off light 10c. At the same time, a solenoid 37b operatively associated with time meter 11b will be removed from the circuit with transmitter TR1 and meter 11c (indicated diagrammatically only by its associated relay 37c) exactly as was described in connection with the closing and opening of the contacts 25a, 19a and 32a, with respect to light 10a.

It will be noted from a consideration of Fig. 4, and from the above described operation thereof, that the turn-on relay 18 for each light 10 is in a series circuit through the contacts 19 associated with that light, with the turn-off relay 16 of the next adjacent light (considering the last light illustrated 10d representing terminal station T$_2$ as adjacent to the first light 10a representing terminal T$_1$); and that each of these series circuits is in series with key 14 and the source of energy represented by generator 22. Further, the initial arrangement of the teeter bars 24 is such that only one of the pairs of contacts 19 is closed at any one time, and correspondingly, only one of these circuits is operative at any one time.

From the foregoing it will be evident that any further number of lights 10 having associated turn-off, and turn-on solenoids 10 and 18, in other series circuits identical with those above described, and other meters 11, may be placed on the panel board between illustrated lights 10c and 10d; and that these additional lights will operate, and that the operating solenoids for the additional meters will be placed in circuits later to be considered in exactly the manner described in connection with lights 10a and 10b.

The final light 10d represents the terminal T$_2$; and when the plane passes through the vertical beam from this terminal the light will go off, and the immediately preceding light will go on, exactly in the manner above described. When such occurs it will be noted that its turn-on relay 18d will be placed in series circuit with the turn-off relay 16a of light 10a. Hence, when the plane turns around and starts back over the course the board is ready to repeat its operating cycle in the manner herein described.

From the foregoing, then, it will be apparent that all of the lights will be successively operated so that the one corresponding to the station over which the plane has last passed will always be dark, and the remaining lights will always be lit.

The plane, as was hereinbefore stated, is provided with a sending set TR$_1$ which transmits signals at regularly spaced intervals while it is in flight. For this purpose a cam 38, driven from any suitable clock motor, or the like, 39, successively actuates key 33, preferably at the rate of once a minute; and each closing of the key completes an electrical circuit including lines 40, 41, and 20, switch 12, line 21, generator 22, transmitter TR$_1$, one of the sets of contacts 32, the meter operating solenoid 37 associated with that set of contacts, and back to the key. It will be assumed, for illustrative purposes, that solenoid 37a is in circuit through contacts 32a with key 33. Accordingly, upon each closing of the key, the solenoid will be energized resulting in the pulling down of pawl 42a which is spring-pressed against an appropriate ratchet wheel 43a carried upon the shaft 98 of meter 11a, and the consequent moving of one integer on the dial of the meter. Since these energizations occur at one minute intervals, it is evident that their registration on the meter gives an indication of the elapsed time of flight. Further, since solenoid 37a is in circuit with key 33 from the time the plane passes through the vertical beam at station T$_1$ until it passes through the vertical beam at station S$_1$, the meter 11a records the elapsed time of flight only between these stations.

The operative circuits between key 33, transmitter TR$_1$, and the meter operating solenoids 37, are controlled by the sets of contacts 32. Since only one of these sets is closed at any particular time, it is evident that only one meter will be operative at that time—and the operative meter, as hereinbefore brought out, will always be the one associated with the then darkened light 10. Hence, as the plane successively passes over S$_1$ and S$_2$, etc. the solenoids 37b, 37c for operating meters 11b, 11c, etc. will become operative to record the time of flight between S$_1$ and S$_2$, and S$_2$ and S$_3$, etc., respectively, exactly as described in connection with meter 11a.

The vertical beam from each ground station, as was hereinbefore mentioned, is preferably modulated in such form that it may be reduced to an identifying series of dots and dashes by a radio receiver. Thus, the beam from the terminal station T$_1$ may be the code letter B, whereas that from the station S$_1$ may comprise the code letter C, etc. Therefore, as the plane passes through any one of these vertical beams, that one from terminal T$_1$ being taken as an example, its receiver R$_1$ will pick up the code letter B and consequently the relay 13 will be successively energized to actuate key 14 so as to simulate a dash and three dots. This key, in addition to being in series with the various light-operating relays 16 and 18, is also in series, and at all times, through line 44, with solenoid 45, and a rebroadcasting transmitter TR$_2$. Consequently, as the plane passes through the beam from T$_1$, relay 45 will be successively energized so as to pull the pen 46 downwardly and make a dash and three dots on the chart 47. Accordingly, the pilot seeing the light 10a go out, in the manner previously explained, will look over the chart and be certain that the code letter appearing thereon is the one which identifies the ground station supposedly represented by this light. At the same time the transmitter TR$_2$ will be successively energized to transmit the code letter B from the plane so that it may be picked up by a receiver at the ground station T$_1$ and there be recorded, as will later be brought out. This transmitter is of very low power, so that its signals will be picked up only by the station over which it is then flying.

As the plane passes over other ground stations, its receiver R$_1$ will pick up and record the identifying code letter thereof, and rebroadcast these identifying letters to such ground stations, exactly as above described.

The repetitive actuation of the key 14 by successive energy output impulses of receiver R$_1$ as the plane passes through a vertical beam from any one ground station, in simulation of the code character identifying that station, tends to energize all of the light actuating circuits (as so far described) in rapid succession. Obviously such operation would utterly destroy the utility of the lights as station indicators. In order to avoid this I provide means which permits the energization of one of the light-actuating circuits upon the closing of key 14 in response to one output energy impulse of receiver R$_1$, and which thereafter short circuits the light operating circuits for a prescribed period of time. If it be assumed that the plane is leaving terminal T$_1$, then upon the first output impulse of its receiver R$_1$, and the consequent closing of key 14, relays 16a and 18d will be energized to turn-off light 10a and to turn-on light 10d in the manner hereinbefore described. Simultaneously, however, solenoid 51 (Fig. 4), in series with key 14 and solenoid 45, will be energized to pull lever 52 downwards, lift teeter-bar 53 and close contacts 48. The closing of the latter contacts effectively short circuits all of the light actuating relays 16 and 18, through lines 49 and 50, thus precluding their operations by successive output impulses of receiver R1 in response to energy picked up from the vertical beam radiating from T1. It has no effect however upon the actual operation of key 14, and hence in no way interferes with the recording of the identifying signal by solenoid 45.

In order to maintain this short circuit for a definite period of time, irrespective of successive energizations of solenoid 51, the right hand end of teeter bar 53 is provided with a pawl 54 which normally engages a notch 55 in the periphery of the cam 56. The movement of the teeter bar to close the contacts 48, lifts this pawl out of its notch and permits the rotation of the cam by any suitable motor (not shown). As is apparent, the periphery of the cam will hold the teeter bar up, and the contacts closed, for one revolution at the end of which the pawl will again drop into the notch 55 and allow the contacts to open. Since the whole point of this scheme is to short-circuit the light-operating mechanism for a period sufficient for the plane to pass through any particular vertical beam, the cam 56 is designed to make one revolution in a period of time, say 2 minutes, sufficient to accomplish this end; and at the end of that period of time the contacts will be open and the light-operating mechanism will again be placed in operative circuit so as to be affected when the plane again enters the sphere of one of the vertical beams.

If desired, further radio receivers such as the one shown at R4 may be utilized for energizing other relays such as that shown at 57, for the purpose of operating other keys 58 and energizing other relays 45a to operate other pens 46a and record other data on the chart 47a.

The invention further contemplates the provision of a tracking panel board, generally similar in appearance and functions to the one illustrated in Fig. 3, at each ground station; and one such board with its operating circuits is illustrated diagrammatically in Fig. 5. This board includes a series of lights 100a, b, c and d, each of which corresponds to one of the ground stations in exactly the same manner as do the lights 10 on the panel board shown in Fig. 4; and a series of time recording meters 110a, b, etc., mechanically identical with meters 11a, b, etc., which are utilized to record the time of flight between adjacent ground stations in the manner hereinbefore described in connection with meters 11. The lights 100, and the meters 110, each have associated therewith turn-off relays 160a, b, etc., turn-on relays 180a, b, etc., teeter bars 240a, b, etc., contacts 250a, b, etc., contacts 190a, b, and contacts 320a, b, etc. for turning the lights on and off, and for placing the time meter actuating solenoids 370 in operative circuits, exactly as was described in connection with Fig. 4. The principal difference between these boards is in the source of energy to which the various relays operatively respond.

It will be remembered that each time the plane passes through a vertical beam the code letter identifying that particular beam will be rebroadcast from the plane transmitter TR2. This rebroadcast signal will be picked up by receiver SR1 (indicating station receiver 1) to energize relay 130, and successively close key 140 to duplicate this rebroadcast signal. The initial closing of key 140 completes an electrical circuit including line 150, turn-off relay 160a, contacts 190d, turn-on relay 180d, line 200, generator 220, and back to the key. The closing of this circuit, in turn, effects a turning-off of light 100a, and a turning-on of light 100d; a closing of contacts 320a to place solenoid 370a of meter 110a in an operative circuit; and to close contacts 190a so as to place turn-on relay 180a for light 100a in series with turn off relay 160b of light 100b. Simultaneously, the first closing of contact 140 will energize solenoid 510 to close contacts 480 (through the intermediary of lever 520 and teeter bar 530) so as to short-circuit the light-operating means through lines 490 and 500. This short-circuit is maintained for a definite period of time, say two minutes, by the rotation of cam 560, in exactly the manner described in connection with cam 56 of Fig. 3. Further, the successive closings of key 140 will effect an operation of solenoid 450 to print the beam identifying code letter on chart 470; and successive energizations of transmitter STR2 (station transmitter No. 2) to rebroadcast this code letter to all of the other stations along the route.

It will be remembered that the rebroadcasting transmitter TR2 of the plane is of very low power. Thus the only function of STR2 is to rebroadcast this signal so as to effect an operation of receivers SR1, and thereby the operation of lights and time meters of the identical panel boards at the stations remote from the then position of the plane.

As the plane progresses along the route and enters the sphere of influence of the beam from another station, the receiver SR1 of that station will then be energized and effect a turning off of light 100b or a turning on of light 100a, a recordation of the code letter of that station, the short-circuiting of the light-operating means, and the rebroadcasting of that signal so as to effect the operation of the panel boards located at their remote stations exactly in the manner above described.

The plane, as was previously stated, is constantly sending out a series of signals, at intervals of one minute, through the agency of transmitter TR1. This transmitter will also be of relatively low power having a range approximately equal to the distance between any two ground stations. These minute signals will be received by receiver SR3 only on the stations then closest to the plane. The output of this receiver is utilized to energize a relay 59 to close key 60 at one minute intervals, and this key, through lines 61, is in series with the closed set of contacts 320 and the associated relay 370 of the corresponding meter 110; and through lines 62 and 63, with the rebroadcasting transmitter STR4 (station transmitter No. 4), and generator 220. Accordingly, each minute signal received by SR3 will be recorded on the operative one of the meters 110, and will be rebroadcast through STR4 so as to affect similar receivers SR3 on the stations remote from the then position of the plane.

From the foregoing, then, it is evident that the lights 10 on the plane panel board, and the lights 100 on the various panel boards located at the various stations, will be operated substantially simultaneously to indicate at all times the station over which the plane has last passed; and the various meters, 11 on the plane and 110 on the various ground stations, will likewise be operated almost simultaneously to record the time of flight between adjacent ground stations.

Each ground station, as has hereinbefore been mentioned, has a beam transmitter BTR which is in series electrically with a generator 64 and operating key 65. The latter element has a bar 66 adapted to engage a series of raised segments formed on the drum 67, the latter being mounted upon the shaft 68 of any appropriate motor 69. Consequently, the key 65 will be successively opened and closed to complete a circuit with the transmitter BTR so as to modulate the output energy of the transmitter which is radiated from an appropriate directional antenna indicated diagrammatically at 70 as a vertical beam and the code character which this beam takes will be dependent upon the raised segments on the drum 67.

The beam transmitters at the different ground stations may all be identical except in so far as the raised segments of their respective drums 67 represent different identifying characters.

The various functions incident to the tracking of the plane, that is the operation of the meters and the lights, both on the plane and at the stations; and the rebroadcasting of various identifying characters both from the plane and from the ground stations, is all accomplished by means of radio communication. In order to avoid interference between the various functions, an individual clear wave band length is assigned to the sending and receiving apparatus for each function. Thus the vertical beams transmitted from the different ground stations will all be of the same wave length, and consequently receiver $R_1$ on the plane will be attuned to this length; and the rebroadcasting transmitter $TR_1$ will operate on another assigned wave length, and hence the receivers $SR_1$ on the stations will be attuned to this latter wave length. Since the receiver $SR_1$ must respond either to the signal from the transmitter $TR_2$ on the plane or the transmitter $STR_2$ at a ground station, it is evident that this latter transmitter will operate on the same wave length as does the transmitter $TR_2$. The minute signal transmitter $TR_1$ on the plane will also be assigned an individual wave length, and the receiver $SR_3$ on the ground stations will be attuned to receive these signals. Since this latter receiver must also respond either to a signal from $TR_1$ on the plane, or $STR_4$ on the ground station, it is evident that the latter transmitter must operate on the same wavelength as does transmitter $TR_1$. In any event, the various receivers and transmitters will be assigned to operate at different frequencies so that no interference therebetween may be occasioned.

Since certain changes may be made in the invention without in any way departing from the true scope thereof, it is intended that the foregoing shall be construed in a descriptive rather than in a limiting sense.

What I claim is:

1. In an aerial navigation system including a plurality of ground stations located at intervals along a desired route and a plane in flight along the route, means at each of said stations for emitting a vertically directed beam of radiant energy, a panel board on said plane having a plurality of lights thereon each representing one of the ground stations, a radio receiver on said plane attuned to the wavelength of the vertically directed beams, and means actuated by the energy output of said receiver for turning off and on said lights thereby to record the passage of the plane over the ground stations.

2. In an aerial navigation system including a plurality of ground stations located at intervals along a desired route and an aircraft in flight along the route, means at each station for emitting vertically directed beam of radiant energy modulated in the form of an identifying series of dots and dashes, a panel board on the aircraft having a series of indicating lights arranged thereon with one such light for each ground station, a radio receiver on said craft attuned to the wave length of the vertically directed beams, and means actuated by the energy output of said receiver for operating said lights successively with said means arranged to affect a light each time the aircraft passes through one of the beams, and means also actuated by the energy output of said receiver for recording the identifying dots and dashes of the vertical beam through which the plane is then passing.

3. In an aerial navigation system including a plurality of ground stations located at intervals along a desired route and a plane in flight along the route, means at each station for creating a vertically directed radio beam of radiant energy, said vertically directed beams being modulated in the form of a series of identifying dots and dashes, a series of indicating lights on said plane there being one for each of the ground stations, a plurality of recording meters mounted on said plane with one associated with each of said lights, a radio transmitter on said plane arranged to emit signals at regularly spaced intervals, a radio receiver on said plane attuned to the wave length of said vertical beams, means actuated by the energy output of said receiver for operating the lights and the meters successively with said means arranged to operate one light and to place one meter in an operative circuit with said transmitter to record the emission of spaced signals each time the plane passes through one of said vertical beams, and means also on the plane also actuated by the energy output of said receiver for recording the identifying dots and dashes of the particular vertical beam through which the plane is then passing.

4. In an aerial navigation system including a plurality of ground stations located at intervals along a desired route and a plane in flight along the route, means at each station for emitting a vertically directed beam of radio frequency energy modulated in the form of an identifying series of dots and dashes, a first radio transmitter located on the plane and arranged to emit signals automatically at regularly spaced intervals, a panel board on the plane including a plurality of lights there being one for each of the ground stations, a plurality of meters with one associated with each of said lights, and a recording chart, a radio receiver located on the plane and attuned to the wave length of the vertically directed beams, means actuated by the energy output of said first mentioned receiver for operating said lights and said meters successively, said last mentioned means being adapted to operate one light and to place an associate meter in an operative circuit with said first mentioned transmitter to record the emission of signals each time the plane passes through one of the vertical beams, means also actuated by the energy output of said first mentioned receiver for recording on said chart the identifying dots and dashes of the vertical beam through which the plane is then passing, a rebroadcasting transmitter located on the plane and actuated by the energy output of said first mentioned receiver to rebroadcast to the station over which the plane is then passing the signals received by said first mentioned receiver; a panel board on each station including a series of lights, there being one for each ground station, a radio receiver located on each ground station and attuned to the wave length of the rebroadcasting transmitter of the plane, means actuated by the energy output of said second mentioned receiver for operating said light successively, means also actuated by the energy output of said second mentioned receiver for recording the identifying dots and dashes of the vertical beam through which the plane is then passing, and a radio transmitter on each ground station which is actuated by the energy output of said second mentioned receiver to rebroadcast to other ground stations information as to the passage of the plane over a particular ground station.

5. A navigation system in accordance with claim 6 which is further characterized by providing each ground station panel board with a series of meters each associated with one of the lights, a second radio receiver which is attuned to the wave length of the spaced signal transmitter on the plane, a radio transmitter on each ground station actuated by the energy output of said second receiver for rebroadcasting the spaced signals received from the plane, and means also actuated by the energy output of said first mentioned receiver on the stations for placing successive meters of the station panel board and said last mentioned transmitter in an operative circuit with the output of the second mentioned receiver whereby the spaced signals received from the plane will be recorded on the station, or stations, nearest the plane, and whereby these spaced signals will be relayed to the more remotely located stations, there to be recorded and relayed.

6. In a radio navigational guide system including a plurality of ground stations located along a desired route and a plane in flight along that route, means at each ground station for emitting a vertically-directed beam of radio frequency energy on a common assigned wavelength and modulated as a series of dots and dashes identifying that particular station; a radio receiver on the plane attuned to the wavelength of the vertically directed beams; a relay actuated by the output energy of the receiver in simulation of the signal modulation of the beam; means in circuit with the receiver-relay adapted to record the signal modulation of the beams; a series of indicating lamps on the plane, there being one for each ground station; a circuit for each lamp including a source of energy and a relay having a turn-on and a turn-off solenoid; a plurality of parallel circuits, each including a source of energy, the receiver-relay, the turn-on solenoid of the relay for one lamp, the turn-off solenoid of the relay for the next adjacent lamp, and a pair of contacts which are opened by the energization of the turn-on solenoid in that circuit and are closed by the energization of the turn-off solenoid of that particular lamp relay; said circuits being initially arranged with only one of said pairs of contacts closed whereby the closing of the receiver-relay will energize only one of said parallel circuits to turn-off one of the lamps and close the contacts in one of said parallel circuits and simultaneously to turn-on an adjacent lamp and open the contacts in another of said parallel circuits; and means for short circuiting all of said parallel lamp-operating circuits after the first output energy impulse of said receiver for a period of time sufficient to allow the plane to pass completely through the vertically-directed beam from the station over which it then is.

7. An apparatus for tracking the course of a plane over a plurality of ground stations each emitting identifying, signal modulated, vertically directed, radio frequency beams on a common wavelength, a radio receiver carried by the plane and attuned to the wavelenth of such beams; a relay actuated by the output energy of said receiver in simulation of the signal modulation of the beams; a series of indicating lamps, there being one for each ground station; a plurality of circuits each including a source of energy, one of said lamps and a solenoid operated relay; a plurality of parallel circuits each including a source of energy, the receiver-relay, the solenoid of one of said light operating relays, and a pair of contacts, said parallel circuits being initially arranged with only one of said pairs of contacts closed whereby the closing of the receiver-relay will energize the light operating relay solenoid of at least one of said parallel circuits; and means for thereafter short-circuiting all of said parallel light operating circuits for a predetermined period of time.

8. A radio navigational system according to claim 7, further characterized by the provision of a series of recording meters each associated with one of said lights; a solenoid for operating each meter; a plurality of parallel circuits each including a source of energy, an automatically operated switch which closes at regularly timed intervals, one of said meter operating solenoids, and a pair of contacts which are adapted to be opened and closed by the energization of the turn-on and turn-off solenoids of one of said light operating relays whereby the closing of the receiver-relay to operate the lights successively will also effect the closing and opening of successive ones of the parallel circuits including the meter operating solenoids.

9. In an aircraft tracking system including a plurality of ground stations each having a radio transmitting apparatus for emitting a characteristic signal modulated, vertically directed, beam of radiant energy on a common assigned wavelength, and a radio receiver attuned to another assigned wavelength, a radio receiver carried by the aircraft and attuned to the wavelength of the vertically directed beams; a relay operated by the energy output of the aircraft receiver in simulation of the signal modulation of the vertically directed beams; a radio transmitter carried on the aircraft and broadcasting radiant energy on the assigned wavelength to which the ground station receivers are attuned, said transmitter having its input circuit in series with said receiver-relay whereby its radio frequency output energy will be modulated to repeat the characteristic signal modulation of the vertically directed beams; means on the aircraft in series with the receiver-relay adapted to record the characteristic signal modulation of the various beams; another relay adapted to be operated by the output energy of the ground station receiver; and means in series with this last-mentioned relay for recording the identifying characteristics of the beam as repeated by the aircraft transmitters.

10. An apparatus for tracking the course of a plane over a plurality of ground stations located at intervals along a proposed course of flight and each of said stations having a radio transmitter adapted to emit an identifying dot-dash signal on a common assigned wavelength in the form of a vertical beam, a radio receiver on the craft attuned to the common wavelength of the vertical beams and adapted to be energized whenever the craft passes through one of such beams, a series of indicating lamps on the craft, there being one for each of the ground stations, a switching means associated with each indicating lamp for opening and closing a circuit including that lamp, means actuated on the first output energy impulse of said receiver as the craft successively passes through the beams for operating said switching means successively to open and close the circuits including said indicating lamps, and means for short-circuiting the switching means after each actuation to operate a successive indicating lamp for a period of time sufficient to permit the aircraft to pass through the beam then affecting said receiver.

11. An apparatus for tracking the progress of an aircraft over a plurality of ground stations located along a proposed course of flight and each having a radio transmitter adapted to emit radiant energy on a common assigned wavelength in the form of vertical beams comprising: a radio receiver attuned to the wavelength of the beam transmitters so as to be energized whenever such aircraft passes through one of such beams, and a relay including a repeating key actuated by the energy output of said receiver; a series of lights on said aircraft, there being one for each of the ground stations; a circuit for each light including a first pair of separable contacts, the light and a source of electrical energy; a second pair of contacts associated with each light and located adjacent each of the first mentioned pairs; means associated with each light for opening and closing each of the firstmentioned pairs of contacts while simultaneously closing or opening respectively the adjacent one of the second-mentioned pairs; a pair of solenoids associated with each of the last-mentioned means for each light with one adapted when evergized to actuate the means so as to open the first-mentioned pair of contacts while closing the second-mentioned pair, and the other when energized to actuate the means so as to close the first-mentioned contacts while opening the second-mentioned pair; and a plurality of parallel circuits, each including in series the said relay key, the second mentioned solenoid and the second-mentioned pair of contacts for one of said lights and the first-mentioned solenoid for the next succeeding light and a source of electrical energy, said parallel circuits being initially arranged with only one of said second-mentioned pairs of contacts closed whereby, upon the closing of said relay key in response to the output energy impulse of said receiver, the circuit including such closed contacts will be energized to turn-on one light, to open the initially closed second-mentioned contacts, to turn-off the next succeeding light and to close the second-mentioned contacts in the next succeeding parallel circuit.

12. An apparatus for tracking the course of an aircraft according to claim 11, further characterized in that the vertically directed beam energy from each station is modulated as a series of dots and dashes identifying that particular station; by the provision of a circuit including said relay key, and yet another solenoid; means operable responsive to energization of the last mentioned solenoid for recording energy output impulses from said receiver; and a further circuit including a pair of separable contacts shunted across all of the parallel circuits including the light operating solenoids; means including yet another solenoid in series with said relay key for closing said last mentioned contacts upon the first energy impulse output by said receiver whereby to short circuit the parallel light operating circuits; and means for holding said last mentioned contacts closed for a definite period of time.

13. An apparatus for tracking the course of an aircraft according to claim 11, further characterized in that the vertically directed beam from each station is modulated as a series of dots and dashes identifying that particular station; a circuit including in series relation said relay key a recorder solenoid, a shunt-operating solenoid, and the input circuit of a radio transmitter; means operable responsive to successive energizations of said recorder solenoid for recording the energy impulses output by said receiver; a further circuit shunted across the parallel circuits including the light-operating solenoids, said further circuit including a pair of separable contacts; means operable in response to an initial energization of said shunt-operating solenoid for closing said last mentioned contacts; and means for holding such last mentioned contacts closed for a definite period of time.

RUBINO PLASTINO.

CERTIFICATE OF CORRECTION.

Patent No. 2,171,293.   August 29, 1939.

RUBINO PLASTINO.

It is hereby certified that error appears in the printed specification of the above numbered patent requiring correction as follows: Page 6, first column, line 15, claim 5, for the claim reference numeral "6" read 4; page 7, first column, line 38, claim 11, for "evergized" read energized; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.